May 3, 1955        J. J. SLOYAN        2,707,659
SUPPORT WITH CHATTER-STOPPING ELEMENT
Filed Feb. 7, 1950
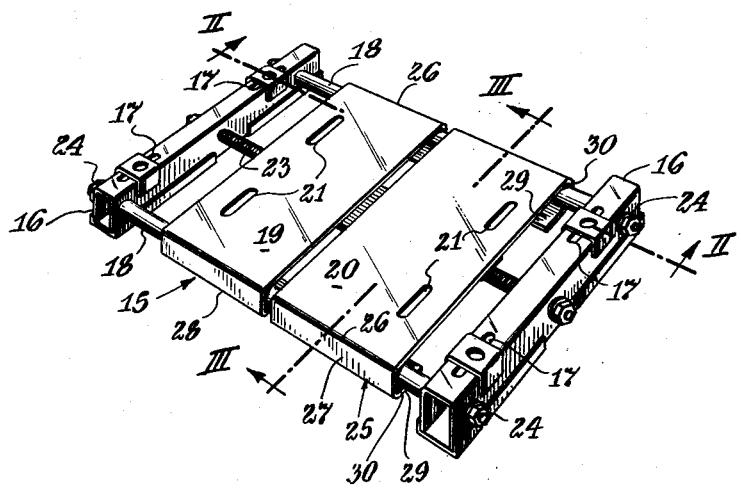
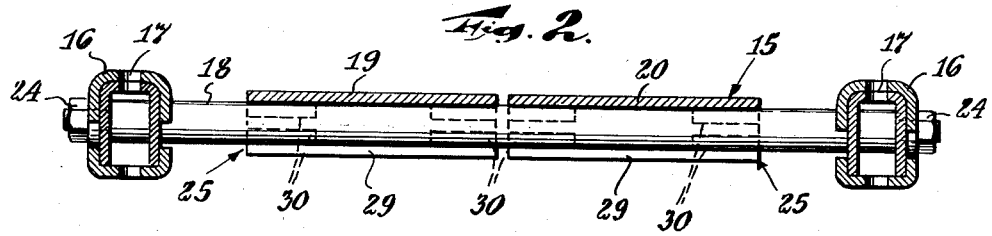
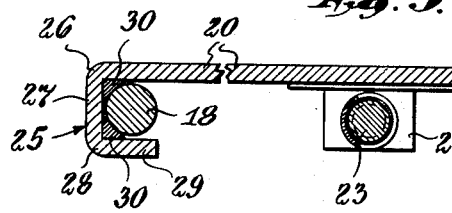 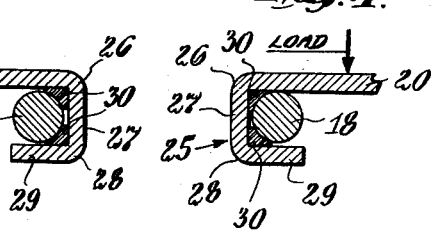
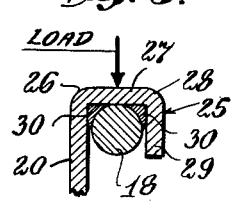 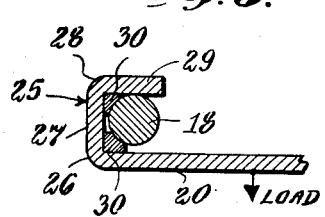 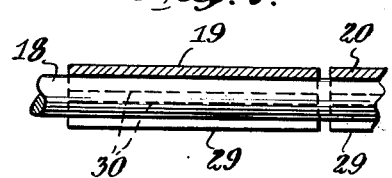
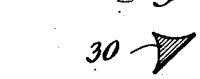  
INVENTOR
JEROME J. SLOYAN.
BY
Howard P. King
ATTORNEY United States Patent Office 2,707,659
Patented May 3, 1955

2,707,659

SUPPORT WITH CHATTER-STOPPING ELEMENT

Jerome J. Sloyan, Bloomfield, N. J.

Application February 7, 1950, Serial No. 142,833

4 Claims. (Cl. 308—3)

This invention relates to supports, and more particularly to supports having a movable carriage slidable in use on fixed rails.

Devices of this character are commonly utilized for mounting machinery, such as an electric motor, so as to afford latitude of adjustment, or movement for other purposes, of a machine or part of a machine in its relation to another machine or machine part. Often, as with a motor driving some other machine through the agency of a belt, there is present a recurring variation in belt tension or power absorption which introduces reaction of varying characteristics on the contact of the carriage with its rails. This results in chatter, clicking or other noise, and wear from the constant thumping.

In its general aspect, the invention has for its fundamental objective the provision of an improved adjustable slidable mounting for a motor or other machine or machine part.

Likewise from a general aspect, the present invention is directed to the elimination and correction of inadequate structure and detrimental effects of prior art supports.

Generally, also, an object of the invention is to effect a non-chattering seating of a carriage on its rail.

Consistent with the foregoing, an object of the invention is to provide a support wherein exact fit or close tolerances between the rails and carriage are not necessary.

Specifically, an object of the invention is to effect a non-chattering seating of a carriage on its rails without alteration in the machined or metal tolerances.

And of like nature, an object of the invention is, notwithstanding the lack of close tolerances, that play transverse to the rail of said carriage will be maintained at a minimum during operation.

Another specific object is to provide for smooth-riding constant-contact mounting of the carriage on its rails.

Yet another object of the invention is to provide a non-metal gliding and cushioning member functioning to deter lateral displacement between the carriage and rail without preventing metallic sliding contact therebetween.

Other objects of the invention will appear to those skilled in the art to which the invention appertains as the description proceeds, both by direct reference thereto and by inference from the context.

Referring to the accompanying drawing, wherein like numerals of reference indicate similar part throughout the several views, Fig. 1 is a perspective view of a support wherein my invention is employed;

Figs. 2 and 3 are sectional views on lines II—II and III—III respectively of Fig. 1;

Figs. 4, 5 and 6 are cross-sectional views under load conditions of several carriage and rail relationships, showing my invention applicable thereto;

Fig. 7 is a view looking toward the rail in longitudinal elevation and with the carriage in section and showing my invention applied throughout the same length of the rail as engaged by the carriage;

Fig. 8 is a cross-section of my cushioning glider element as it appears prior to inclusion in the carriage;

Fig. 9 is a corresponding cross-section of the cushioning glider element as it appears after inclusion in the carriage; and Fig. 10 is a modified construction of said element in normal configuration before and after inclusion in the carriage.

In the specific embodiment of the invention illustrated in said drawing, the reference numeral 15 designates the support in general which is shown as having a pair of cleats 16 adapted to be secured to any appropriate fixed surface, bolt-receiving slots 17 being shown in the cleats for that purpose. Between these cleats, next the ends thereof is a pair of parallel rails 18 with the ends of the rails securely held by the cleats, and assembled so that the rails and cleats form a rectangle of which the cleats will arbitrarily be referred to as at the ends and the rails as at the sides of the rectangular assembly. Upon the pair of rails rests a carriage which is shown herein as comprised of two sections 19, 20, each extending crosswise from one rail to the other and separable in a direction longitudinally of the rails for enabling motors of different base dimensions to be secured thereon. After the motor is secured to the two sections of the carriage, for which purpose bolt-receiving slots 21 are shown in said sections, it will be obvious that said sections are rigid with respect to the motor and as a consequence said sections, and the motor, move as a unit and the two said sections operate in effect as a single carriage for the motor. At the under side of one section is provided a nut 22 fixed to and depending from said section. An adjusting screw 23 is threaded through the nut, said screw extending from one cleat to the other and held thereby against longitudinal movement, but carried rotatably to thereby feed the nut back and forth and effect the desired adjustment of the carriage along the rails. Resilient or other actuating means for the carriage may be used, if desired.

The rails, as here shown, are cylindrical rods of desired and adequate diameter, the ends of the rod being reduced and threaded, whereby the rods provide shoulders for engagement against the cleats to which they are rigidly secured by nuts 24 on said threaded ends.

The carriage is retained slidably on the rails by riders 25 at the side marginal portions of the carriage sections 19, 20 which overlie the cylindrical rails and theoretically rest upon and make line contact therewith. Said marginal portions beyond the rails are bent at right angles, as at 26, to depend at the outside of the rails, as at 27, and theoretically make a second line contact therewith. Then again, said depending portions 27 are bent inwardly, as at 28, to underlie the rails and thereby providing retaining lips 29 theoretically making a third line contact with the rails directly opposed to the first mentioned line contact.

There is, however, discrepancy between theory and practice, and because of inequality of material thickness, tolerance of rail diameter, slight differences in results of machine bending of the depending portions 27 and lips 29, and other causes, such as the need to avoid friction-producing tight contact, it is necessary in actual manufacture to allow clearance of the carriage riders on the rails, generally of the order of a few thousandths of an inch. Such clearance is shown in the drawing very greatly exaggerated so that its presence will be obvious to a casual observer. Due to this clearance and service conditions of drive and load, clicking or chatter of the carriage rider against the rails has occurred, this being both a source of annoyance and of wear. The present invention constitutes a solution of the problem, thus stated as heretofore prevailing.

Whereas the rails have been shown circular in cross-section, and the rider 25 has angular cross-section, the corners of the rider thereby provide divergent regions between the respective surfaces of rider and rails laterally from the several theoretical points of contact. The two surfaces thus diverging from the line of contact constitute a pair of surfaces. According to the present invention, I provide cushioning glider means or element 30 in at least a part of the length of one or more of the said divergent regions. The cushioning means or element is in effect a fillet with a cross-sectional area filling the cross-sectional area produced by the divergent region and dissimilitude of the geometric shapes of the rails and riders. Said cushioning means or element comprises a material softer than the metal or metals of the rail and rider, and preferably is a leather fillet, although it is within the scope of the invention to utilize other resilient or elastic material, organic or inorganic, natural or manufactured, but in each instance preferably of a character having a low coefficient of friction. The drawing illustrates a cushioning element in each of the four corners provided by the riders on the two rails, and, in the absence of applied forces or weight, the said cushioning element thus employed will each take up part of the metal-to-metal clearance and thereby slightly space the rider from the rail at top, bottom and side thereof with the cushioning element interposed as the actual mounting support for the carriage as shown in Fig. 2. It is within the scope of the invention, however, to employ a cushioning element at only the top corners or only at the lower corners of the riders, if so desired, with preference in such electron to provide said cushioning element only at the lower corners.

In practice, the weight of the motor or other machine part indicated by the arrow designated "load" in Figs. 4, 5 and 6, will deform the cushioning element by compressive force and thereby permit a metal-to-metal line contact to become effective for load-supporting purposes along the rail, the opposite cushioning element expanding to compensate for all of the clearance in the loaded direction between rider and rail. This expanded cushioning element, by virtue of its resiliency or elasticity, tends to keep the rider seated on the rail, but any lifting of the rider from the rail permits the compressed cushioning element to again enter between the rider and rail so that resumption of metal-to-metal contact is delayed and click and chatter of metal-to-metal is prevented and resultant wear eliminated. This same action takes place irrespective of whether the support is mounted with the body of the carriage at the top, as in Figs. 1 to 4, inclusive, or at the side as in Fig. 5 or underneath, as in Fig. 6.

The cushioning glider element may be secured in place, as by use of an appropriate adhesive applied between it and the rider, so that the said element will slide with the carriage on the rails. Furthermore, the said cushioning means may be short lengths appropriately located within the rider, as for instance, next the end margins of the carriage sections as indicated in Fig. 1, or may be the full lengths of said sections as indicated in Fig. 7. In cross-sectional configuration, the said cushioning means or element, before introduction into the corners of the rider may have a contour somewhat as shown in Fig. 1, with the faces of the said element which are to be secured to the perpendicular metal faces of the rider, concave, whereas the third face that is to engage the rail is substantially a plane. Then when the two concave faces are forced into secured engagement with the rider, the third face will be retracted and then be concave and have a contour such as shown in Fig. 9. This gives an approximate shape to the said cushioning element of the region formed between the rail and rider so the cushioning element will readily deform to the normal condition of filling that region and compensating for clearance between the metal parts when the carriage is mounted on the rail.

However, if so desired, and as illustrated in Fig. 10, the normal pre-assembled cross-sectional contour of the cushioning element may be triangular, of which two faces are at the same angle as and to be secured to two faces of the rider. The third face is a hypotenuse and is subject to compression and deformation to an arc to correspond to the curvature of the engaged portion of the rail when the carriage is assembled on the rail.

Other detail changes and modifications in the structure and utilization of the invention may be made within the scope of the following claims.

I claim:

1. A support comprising a metallic rail and metallic member in slidable relation to each other and one mounted on the other with opposed metallic areas thereof facing toward each other and adapted to make longitudinal slidable and substantially line contact with each other in use, said rail and member normally having a clearance therebetween, said facing areas being divergent from each other providing spaces between said areas, and cushioning elements interposed between said rail and member in engagement therewith and in said spaces for maintaining normal clearance between said rail and member, said cushioning element being compressible in use and said rail and member thereby having metal to metal contact under a load condition in use.

2. A support comprising a metallic rail and metallic member in longitudinal slidable relation to each other and one mounted on the other with diametrically opposite pairs of metallic areas of which the areas of each pair face toward each other and are selectively adapted to make line contact with each other in use, said rail and member normally having a clearance between each pair of said areas, said facing areas of each pair being divergent from each other providing spaces between said areas, and compressible and expansible body cushioning elements interposed longitudinally between said areas of said pairs of areas between and in engagement with the rail and member, one of said elements compressing and the other expanding as the clearance decreases and increases respectively between said rail and member contiguous to said elements thereby compensating for said clearance decrease and increase, each of said cushioning elements being compressible and expansible in use throughout its interposed length, and said rail and member thereby having longitudinal metal-to-cushioning element sliding contact at both pairs of said areas under all load conditions developed in use and having a selective metal-to-metal engagement at one of said opposed pair of areas under load conditions compressing either of said cushioning elements.

3. A support comprising a rail and member in slidable relation to each other and one mounted on the other and having cross-sectional shapes differing one from the other and with one directly contactable with and slidable on the other with substantially a line contact and providing areas having divergent regions extending laterally from said contactable line contact and between said rail and member, and a cushioning element in said divergent region offset from said line contact and in engagement with both said rail and member, said rail and member being in line contact on compression of said cushioning element.

4. A support comprising a cylindrical metallic rail and rectangular metallic member with the rail within said member and slidable in line contact with the member and with the line contact at a distance from the corner of said member, and a cushioning element between the corner of and in engagement with both said rectangular member and the cylindrical surface of said rail, said cushioning element having a thickness tending to hold the rail and member out of contact and compressible to permit contact of said rail and member, said member being contactable with said rail adjacent to an edge of said element upon compression of said element.

References Cited in the file of this patent

UNITED STATES PATENTS

| | | |
|---|---|---|
| 447,015 | Reiss | Feb. 24, 1891 |
| 1,381,188 | Gury | June 14, 1921 |
| 1,388,967 | Noble | Aug. 30, 1921 |
| 1,926,392 | Kritzer | Sept. 12, 1933 |
| 2,076,071 | De Bolt | Apr. 6, 1937 |
| 2,196,891 | Berndt | Apr. 9, 1940 |
| 2,415,820 | Herring | Feb. 18, 1947 |
| 2,440,919 | Shaw | May 4, 1948 |
| 2,498,392 | Boyle | Feb. 21, 1950 |